United States Patent

Youmans

[15] 3,648,515
[45] Mar. 14, 1972

[54] RADIOACTIVITY LOGGING APPARATUS HAVING SHIELDED WALL CONTACTING SOURCE AND DETECTOR

[72] Inventor: Arthur H. Youmans, Houston, Tex.
[73] Assignee: Dresser Industries, Inc., Dallas, Tex.
[22] Filed: Oct. 29, 1969
[21] Appl. No.: 872,258

[52] U.S. Cl. .................................73/152, 250/83.6 W
[51] Int. Cl. .......................................................E21b 47/00
[58] Field of Search......................73/152, 151; 250/83.6 W; 324/6

[56] References Cited

UNITED STATES PATENTS

| | | |
|---|---|---|
| 2,725,282 | 11/1955 | Buckley et al.....................250/83.6 W |
| 3,038,076 | 6/1962 | Scherbatskoy...............250/83.6 W X |
| 3,311,876 | 3/1967 | Lee..............................250/83.6 W X |
| 3,508,439 | 4/1970 | Alger........................................73/152 |

FOREIGN PATENTS OR APPLICATIONS 828,917   2/1960   Great Britain ....................250/83.6 W

*Primary Examiner*—Jerry W. Myracle
*Attorney*—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

A logging apparatus having a subsurface instrument with a partially shielded source and a separate partially shielded detector, both of which contact the borehole wall. Structure combined with the source provides means whereby a neutron log or acoustic log may be obtained in conjunction with the basic measurement.

10 Claims, 5 Drawing Figures

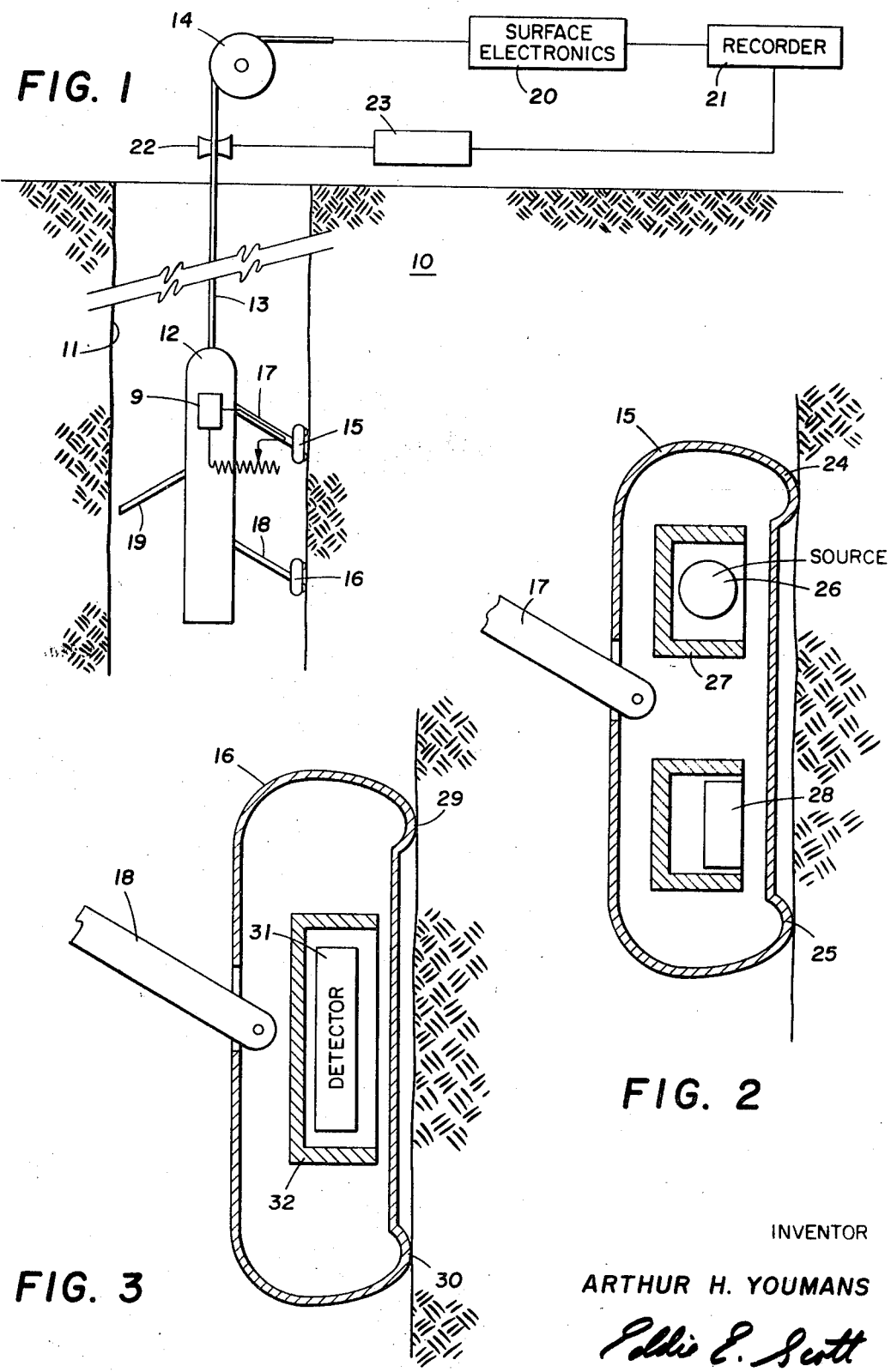

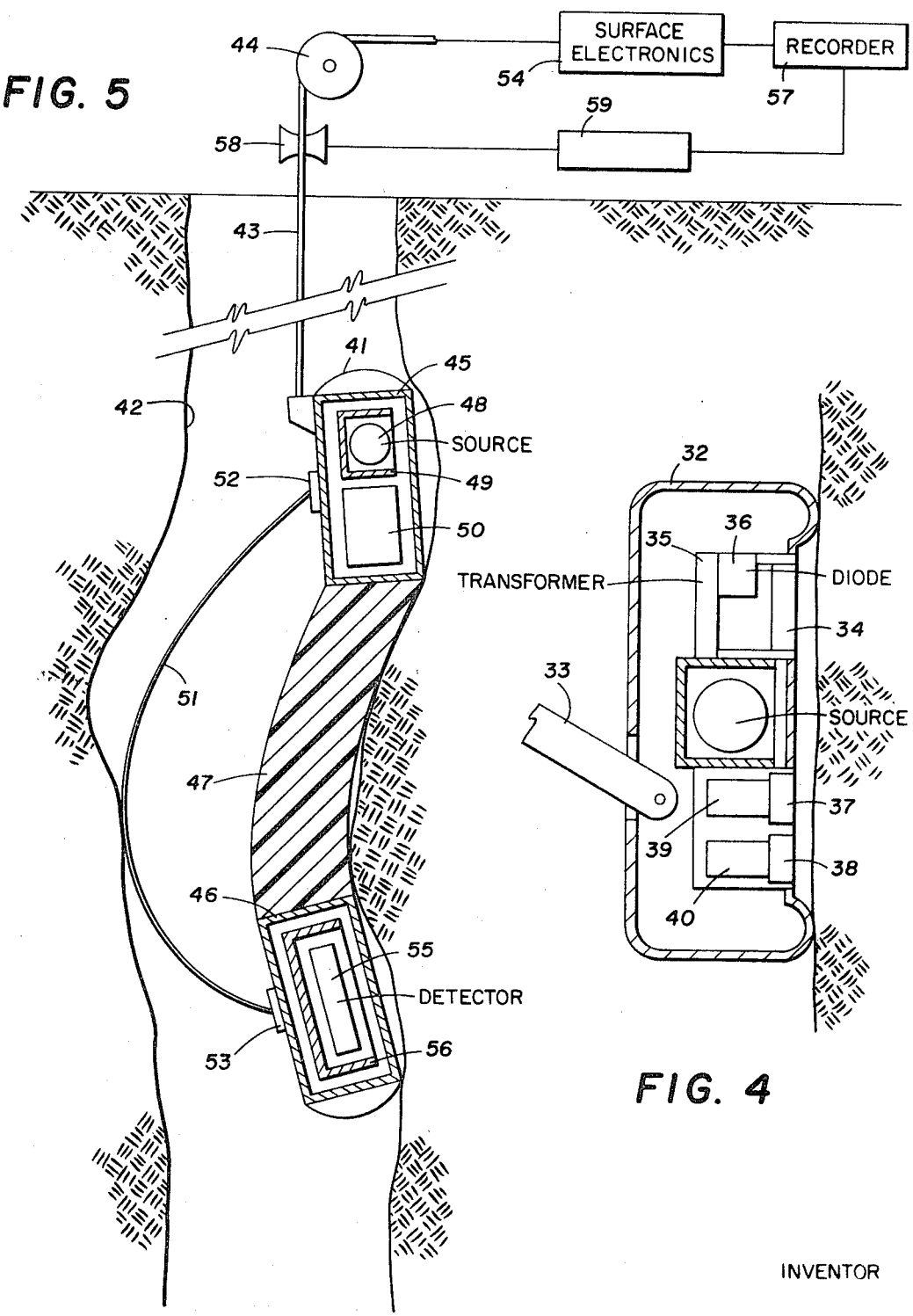

3,648,515

RADIOACTIVITY LOGGING APPARATUS HAVING SHIELDED WALL CONTACTING SOURCE AND DETECTOR

BACKGROUND OF THE INVENTION

This invention relates to the art of geophysical prospecting and more particularly to a system wherein elements in the formations surrounding a borehole are activated by bombardment with neutrons from a neutron source and a detector monitors the induced activity.

DESCRIPTION OF THE PRIOR ART.

Prior art logging systems have encountered difficulty because they have been unable to overcome the adverse effects of a number of variable borehole parameters. These prior art systems have generally been limited to a neutron source and detector contained in an instrument having a long inflexible housing. Since the walls of the borehole to be logged are frequently rough and irregular due to erosion, the distance between the instrument and the borehole wall might vary as the logging instrument is moved through the borehole with a consequent effect on the log. This results in a log seriously affected by the thickness, chemical content and density of the mud and mudcake between the borehole instrument and the formation of interest.

The ideal situation would be to have the neutron source remain in contact with the borehole wall to provide uniform irradiation of the formation and to also have the detector remain in contact with the borehole wall as the instrument moves through the borehole, thus providing uniform detection.

Prior art systems have been limited in attempting to provide such a device because of the size limitations imposed upon a neutron source to be used in the confines of an earth borehole and the added precautions necessary when using a very expensive and highly radioactive neutron source. The possibility of losing a logging instrument in an earth borehole is always present, which imposes certain practical limitations on the cost of components used in a subsurface instrument. In addition, the loss of a highly radioactive source with a long lifetime would be catastrophic in that further operations in the borehole would be seriously handicapped.

SUMMARY OF THE INVENTION

The present invention provides a subsurface instrument with a neutron source and detector that will move along the side of the earth borehole. Although a variety of neutron sources are contemplated the preferred embodiment incorporates a californium-252 neutron source because it is small in size, inexpensive, and has a relatively short lifetime. The particular configuration and geometry of the source unit make it possible to combine other logging systems with the neutron source and thereby provide a subsurface package that produces a wide variety of high quality information about the formations with a single traversal of the borehole. An additional embodiment of this invention provides a borehole caliper signal that may be used in combination with the logs to provide additional information about the formations.

It is therefore an object of the present invention to provide a well logging apparatus that will produce measurements that are not affected by boreholes with varying diameters;

It is a further object of the present invention to provide a radioactivity logging device that will produce measurements that are not affected by varying amounts and composition of mud encountered in the borehole;

It is a further object of the present invention to provide a radioactivity well logging apparatus with a neutron source that remains substantially in contact with the borehole wall during the logging operation;

It is still further object of the present invention to provide a radioactivity well logging apparatus with a detector that contacts the borehole wall or remains uniformly spaced from the borehole wall during the logging operation;

It is a still further object of the present invention to provide a radioactivity logging apparatus that combines neutron logging structure with activation logging structure;

It is a still further object of the present invention to provide a radioactivity logging apparatus that combines acoustical logging structure with activation logging structure.

The above and other objects of the present invention will become apparent from a consideration of the following detailed description when taken in conjunction with the accompanying drawings.

BRIEF DESCRIPTION OF THE DRAWING

FIG. 1 illustrates schematically a side elevation partly in cross section of a borehole instrument according to the invention shown in operative position in an earth borehole;

FIG. 2 illustrates schematically a pad neutron source of the apparatus according to FIG. 1;

FIG. 3 illustrates schematically a pad detector section of the apparatus according to FIG. 1;

FIG. 4 illustrates schematically another embodiment of a pad neutron section of the apparatus according to FIG. 1 including means to produce an acoustical log;

FIG. 5 illustrates schematically another embodiment of this invention.

DETAILED DESCRIPTION OF THE INVENTION

Referring now to the drawing in more detail, and especially to FIG. 1, there is illustrated a portion of the earth's surface 10 traversed by an earth borehole 11. A logging instrument 12 is suspended in the borehole by a logging cable 13, the cable 13 being wound on drum 14 at the earth's surface. Pad units 15 and 16 extend from the instrument 12 and are positioned by movable arms 17 and 18. Pad units 15 and 16 are maintained in contact with the borehole wall by extension of arms 17 and 18 and by a movable arm 19 which contacts the borehole wall. Extension and retraction of the units 17, 18, and 19 is controlled by a portion of the surface electronics section 20 according to systems well known in the art. An example of a retractable pad unit is shown in U.S. Pat. No. 3,068,400 to Castel et al. The signals detected by the downhole instrument are transferred to the surface along cable 13 to surface electronics section 20 according to means well known in the art. Signals may be recorded by recorder 21 and this recordation may be correlated with depth in the borehole by means of a measuring sheave 22 which contacts cable 13. The measuring sheave drives transmission 23 which in turn drives the recorder so that the information recorded thereon is related to depth in the borehole.

The pad unit 15 is shown in more detail in FIG. 2. The pad unit is connected to instrument 12 by retractable arm 17. By extension of arm 17 and in some instances extension of arm 19, pad unit 15 is held in contact with the borehole wall. Means 24 and 25 may be included to reduce friction between the pad unit and the wall and to reduce the possibility that the pad unit will become hydraulically stuck to the wall. It is to be understood that means 24 and 25 are not essential to the operation of the invention but in some instances may add to the overall operation of the system. Conventional means may be included to provide a continuous caliper of the borehole. For example, a potentiometer attached to the body of instrument 12 and the movable tap attached to arm 17 may be provided as shown in FIG. 1. Unit 9 in subsurface instrument 12 will then produce a signal representing the borehole diameter and the signal may be transmitted to the surface equipment by cable 13 wherein it may be used in connection with a further embodiment of this invention. The neutron source 26 is surrounded by shielding 27 on all sides except that adjacent to the line of pad contact in order to reduce the amount of interfering radiation. The neutron source 26 in this preferred embodiment is capsulated californium-252 but it is to be understood that other neutron sources may be used, for example, americium-beryllium, radium-beryllium, and plutonium-beryllium. This partially shielded source produces a directional flux of neutrons that irradiate the formations uniformly as the pad unit traverses the borehole. Also contained within the pad unit 15 is a partially shielded unit 28 that may be combined with the activation logging system and a description of the apparatus included in unit 28 will appear later.

As the instrument 12 is drawn through the borehole, the trailing pad unit 16 detects activation induced in the various elements of the formations by neutron bombardment. Pad detector unit 16 is shown in more detail in FIG. 3. Movable arm 18 extending from instrument 12 holds unit 16 against the side of the borehole. Means 29 and 30 are included as described in connection with pad unit 15 to reduce friction and help prevent pad unit 16 from becoming hydraulically stuck to the borehole wall. The detector 31 is shielded on all sides except that adjacent to the line of pad contact so as to minimize natural gamma radiation without appreciably diminishing the detected activation radiation. This makes it acceptable to ignore the natural gamma ray contribution to the measured activation radiation if the source is sufficiently strong. The detector 31 may be a Geiger counter, scintillation counter or other state of the art means for measuring gamma rays resulting from neutron reactions in the formations. The signal from detector 31 is transferred from unit 16 to subsurface instrument 12 by means of a suitable electrical connection. The signal is then transmitted to the surface electronics section by cable 13.

Pad detector unit 16 has been described as remaining in contact with the borehole wall in the previous embodiment; however, in another embodiment the pad detector may be uniformly spaced from the borehole wall during the logging operation. In this embodiment, arm 18 could be held in the retracted position or in a partially retracted position as the instrument is moved through the borehole. Alternatively the detector unit 16 could be mounted in the body of instrument 12. Under such circumstances, the variations in borehole diameter would affect the log produced by detector unit 16. To compensate for this inaccuracy the signal produced by unit 9 representing the borehole diameter could be used to correct the log.

As previously stated with regard to FIG. 2, the neutron source unit 15 also contains a unit 28 for producing a measurement that may be combined with the activation measurement. Unit 28 incorporates a radiation detector together with the electronics necessary to produce a neutron log. The radiation detector may for example be a detector of epithermal neutrons such as a cadmium shielded helium three proportional counter. The log produced by such a detector is termed a "sidewall neutron log". Alternatively it may be a detector of thermal neutrons or a combination of both. Or if desired, two detectors of two different types or at two different spacings from the source might be employed. In general it is desirable to shield the respective detectors from radiation impinging from the direction of the borehole or directly from the source.

In another embodiment of this invention the apparatus combined with the neutron source may be that required to produce an acoustic measurement. A pad unit of this type is shown in FIG. 4. The pad unit 32 shown in FIG. 4 may be substituted for pad unit 15 shown in FIG. 1 and is held against the side of the borehole in the same manner by movable arm 33. A transmitting transducer 34 is mounted in pad unit 32 so as to transmit acoustical energy directly into the formations transversed by pad unit 32. Means to drive transducer 34 include a transformer 35 and dampening diode 36. Receiving transducers 37 and 38 are mounted on base units 39 and 40 respectively. Acoustical energy from transmitter 34 is directed into the formations and measurements made by receiving transducers 37 and 38 contribute information about the formations according to procedures well known in the art.

Referring now to FIG. 5 there is illustrated in schematic form another embodiment of a well logging apparatus of this invention. A logging instrument 41 is suspended in a borehole 42 by a logging cable 43, the cable 43 being wound on a drum 34 at the earth's surface. The instrument 41 has a source unit 45 and a detector unit 46 connected by means of a flexible section 47. An encapsulated californium-252 neutron source 48 is shielded on all sides except the side adjacent to pad contact by shield 49. This provides uniform irradiation of the formations and prevents interfering radiation from affecting the detecting devices included in the instrument. Also included within the source unit is an element 50 which may either house the electronic equipment necessary to produce a neutron log or apparatus to produce an acoustic log. These elements may be the type disclosed in connection with the embodiments of FIGS. 1 through 4. The source and detector units are maintained in contact with the borehole wall by a bow spring element 51 and movable elements 52 and 53 which can be controlled from the earth's surface by electronics section 54. Alternatively, the flexible members may be extended and retracted by means well known in the art, for example, according to the system shown in U.S. Pat. No. 3,200,251 to A. H. Youmans. A flexible element 47 connects the units and may be a rubber section or other suitable flexible material.

The detector unit 46 contains a radiation detector which may be a Geiger counter, scintillation counter, or other radiation detector well known in the art. The detector 55 is partially surrounded by a shielding means 56 which minimizes the natural gamma radiation without appreciably diminishing the activation radiation detected. The signal generated by detector 54 is transmitted by suitable connecting means to cable 43 wherein they are transmitted to the earth's surface. After processing by surface electronics section 54 the signal from the downhole instrument may be recorded by recorder 57 and this recordation may be correlated with depth in the borehole by means of a measuring sheave 58 which contacts cable 43 and a transmission 59 according to a system well known in the art.

It is to be understood that the various elements of FIGS. 1 through 5 have been shown diagrammatically and the associated circuits and power supplies are provided in a conventional manner. The subsurface instruments are constructed to withstand the pressures and mechanical and thermal abuses encountered in logging a deep well. The control system and signal transmission means are according to systems existing in the art.

The embodiments of the invention in which an exclusive property or privilege is claimed are defined as follows:

1. An apparatus for logging the formations surrounding an earth borehole comprising:
   an instrument adapted to traverse an earth borehole,
   said instrument including a first borehole wall contacting pad
   with said pad containing a neutron source and
   individual logging means for determining a physical parameter of the formations surrounding the borehole;
   shielding means substantially surrounding said neutron source on all sides except the borehole wall contacting side;
   a second borehole wall contacting pad connected to said instrument;
   said second pad containing a radiation detector;
   shielding means substantially surrounding said radiation detector on all sides except the borehole wall contacting side; and
   means to maintain contact between the pads and the borehole wall.

2. The apparatus according to claim 1 wherein said individual logging means is a partially shielded epithermal neutron detector for producing a neutron log.

3. The apparatus according to claim 1 wherein said individual logging means is an acoustical logging means.

4. The apparatus according to claim 3 wherein said acoustical logging means includes an acoustical transmitting transducer and at least one acoustical receiving transducer.

5. The apparatus according to claim 4 wherein said neutron source is californium-252.

6. An apparatus for logging the formations surrounding an earth borehole comprising:
an instrument adapted to traverse an earth borehole, including
a first section containing a neutron source,
a second section containing a radiation detector,
flexible means connecting said first and second sections, and
means to keep said first and second sections in contact with the borehole wall.

7. The apparatus according to claim 6 including a detector contained in said first section for producing a neutron log.

8. The apparatus according to claim 7 including an acoustical transmitting transducer and at least one acoustical receiving transducer contained within the first section.

9. The apparatus according to claim 8 including shielding means partially surrounding said neutron source and shielding means partially surrounding said radiation detector.

10. The apparatus according to claim 9 wherein said neutron source is californium-252.

* * * * *